(12) United States Patent
Losma

(10) Patent No.: US 6,267,794 B1
(45) Date of Patent: Jul. 31, 2001

(54) ASPIRATOR FOR OIL MISTS HAVING A SUPPORTING FRAME FOR OSCILLATING AN ENCLOSURE BETWEEN VERTICAL AND HORIZONTAL POSITIONS

(75) Inventor: Giancarlo Losma, Bergamo (IT)

(73) Assignee: Losma S.r.l., Curno (IT)

( * ) Notice: Subject to any disclaimer, the term of this patent is extended or adjusted under 35 U.S.C. 154(b) by 0 days.

(21) Appl. No.: 09/348,347

(22) Filed: Jul. 8, 1999

(30) Foreign Application Priority Data

Jul. 14, 1998 (IT) .............................. MI98A1622

(51) Int. Cl.⁷ .................................. B01D 35/30
(52) U.S. Cl. ................. 55/394; 55/471; 55/473; 416/146 R
(58) Field of Search ............................. 55/400, 401, 392, 55/394, 467, 471, 473; 416/146 R

(56) References Cited

U.S. PATENT DOCUMENTS

| | | | |
|---|---|---|---|
| 3,676,985 | * 7/1972 | Foreman et al. | 55/317 |
| 3,816,981 | * 6/1974 | Carnewal et al. | 55/404 |
| 4,189,310 | 2/1980 | Hotta . | |
| 4,856,968 | * 8/1989 | Armbuster | 417/360 |
| 4,867,764 | * 9/1989 | Piskin et al. | 55/316 |
| 5,681,364 | * 10/1997 | Fortune | 55/400 |

FOREIGN PATENT DOCUMENTS

| | | | |
|---|---|---|---|
| 3702765 | 8/1988 | (DE) . | |
| 0306278 | 3/1989 | (EP) . | |
| 0649997 | 4/1995 | (EP) . | |
| 5-301010 | * 11/1993 | (JP) | 55/467 |

* cited by examiner

Primary Examiner—David A. Simmons
Assistant Examiner—Robert A. Hopkins
(74) Attorney, Agent, or Firm—Guido Modiano; Albert Josif; Daniel O'Byrne

(57) ABSTRACT

An aspirator for oil mists, particularly for machine tools and the like, the particularity of which is the fact that it comprises a substantially cylindrical external enclosure, inside which at least one impeller driven by an electric motor is accommodated, and a filtering module, which allows to filter the air aspirated by the impeller through the filtering module, the enclosure being supported so that it can oscillate by a supporting frame in order to pass from a working position in which its axis is vertical with respect to a resting plane of the supporting frame to a working position in which its axis is horizontal with respect to the supporting plane.

16 Claims, 2 Drawing Sheets

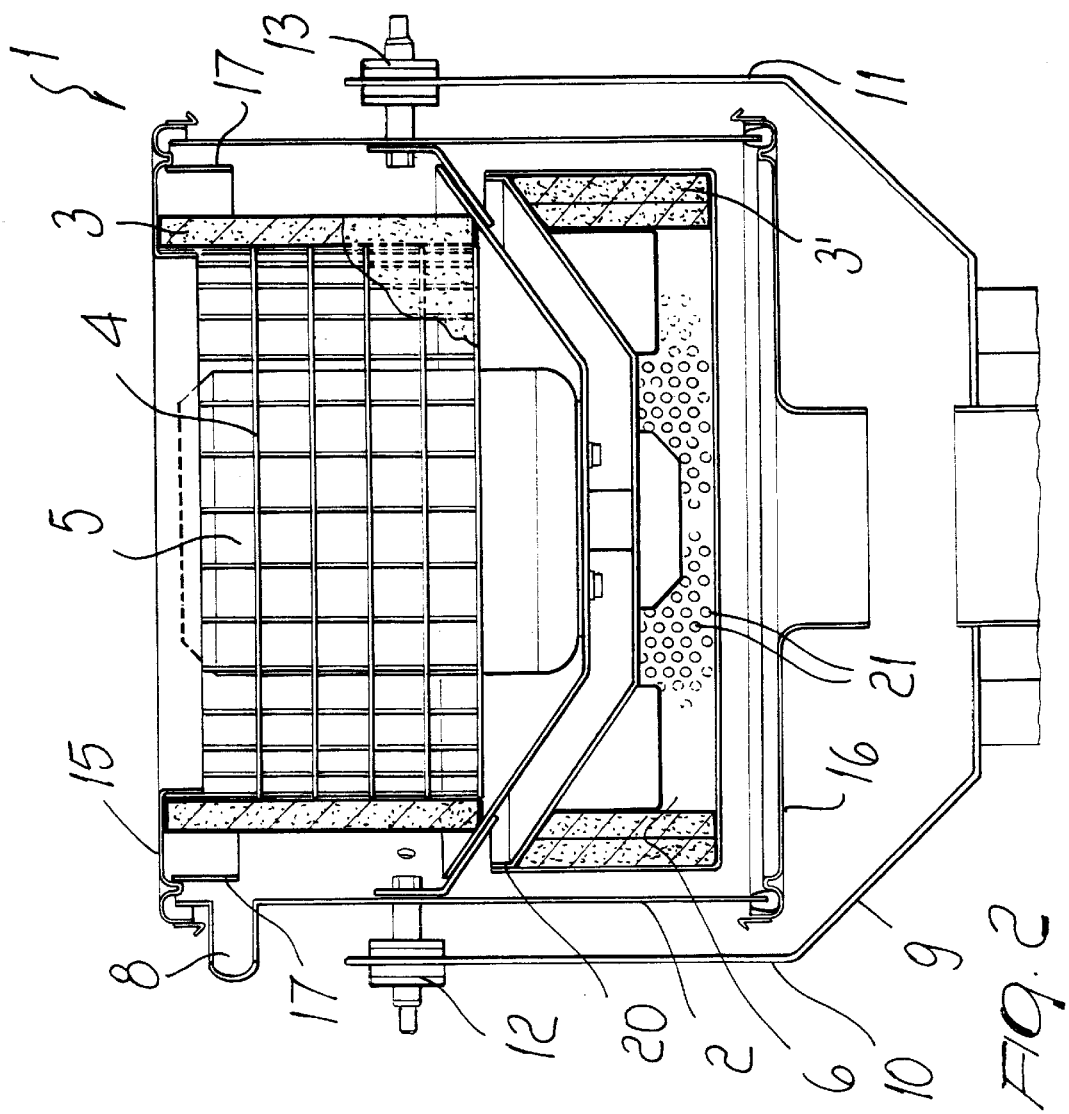
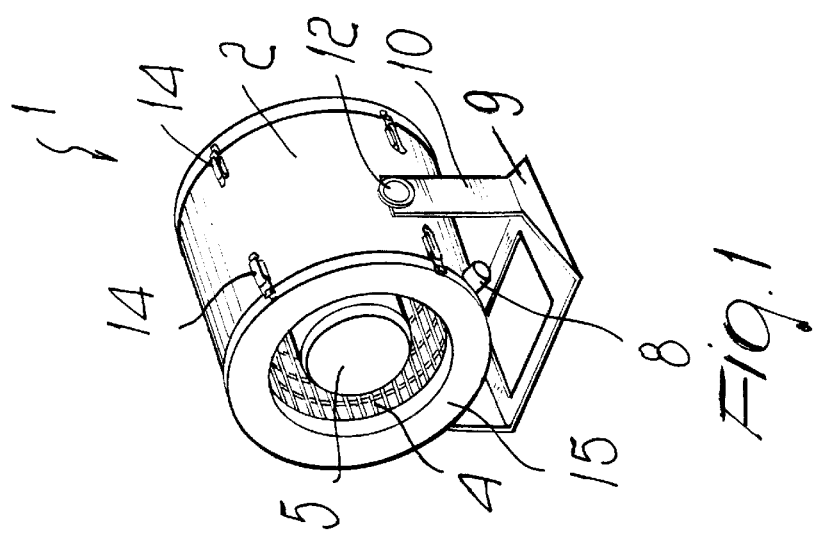

ASPIRATOR FOR OIL MISTS HAVING A SUPPORTING FRAME FOR OSCILLATING AN ENCLOSURE BETWEEN VERTICAL AND HORIZONTAL POSITIONS

BACKGROUND OF THE INVENTION

The present invention relates to an aspirator for oil mists, particularly for machining devices, machine tools and the like.

It is known that during work with machine tools it is normal to use, as coolant, oil emulsions to which whole oils or other liquid coolants, are added, disjoined in water.

Usually only a very small fraction of coolant films clings to the machine tool and most of the film instead remains in the atmosphere; this causes pollution damage in addition to the fact that machine tools operators have to inhale the oil dispersions that are present near the machine tools.

Conventional aspirators separate the oil mist and recondense it in gradually larger particles (coalescence effect) as a direct consequence of the centrifugal force to which the oil particles are subjected.

Conventional aspirators are therefore provided with impellers, through which the oily air to be conditioned is introduced, and with a filtering body through which the air passes, releasing the oil particles, which accordingly tend to cluster and collect to be subsequently expelled from the aspirator by means of a drainage tube.

Conventional aspirators can usually be installed in a fixed position with respect to the machine tool; in other words, it is not possible to change the arrangement of the aspirator from operation with a vertical axis to operation with a horizontal axis.

Accordingly, this sometimes causes difficulties in maintenance because it is necessary to disassemble the aspirator from its support and it also does not facilitate the adaptation of a same type of aspirator to different machine types.

Furthermore, different machine tools require different impellers for air aspiration depending on the type of coolant liquid used, on the greater or smaller presence of solid dust, and on the intake air flow-rate that the aspirator is required to have.

For this purpose, each aspirator is provided with a specific impeller and therefore it is necessary to use a adapted aspirator according to the type of machine tool.

The need is also felt to improve drainage of the oil recovered from the oil mists aspirated by the aspirator and then discharged outside the aspirator.

SUMMARY OF THE INVENTION

The aim of the present invention is therefore to provide an aspirator for oil mists, particularly for machine tools and the like, which can be used operatively both with a horizontal axis and with a vertical axis without requiring the use of particular adaptor supports.

Within the scope of this aim, an object of the present invention is to provide an aspirator for oil mists, particularly for machine tools and the like, in which the drainage tube is arranged so as to improve the drainage of the oil recovered by the aspirator.

Another object of the present invention is to provide an aspirator for oil mists, particularly for machine tools and the like, in which it is possible to install impellers of different types according to the requirements and to the machine tools with which the aspirator is to be associated.

Another object of the present invention is to provide an aspirator for oil mists, particularly for machine tools and the like, in which maintenance and installation operations are simplified with respect to conventional aspirators.

Another object of the present invention is to provide an aspirator for oil mists, particularly for machine tools and the like, which is highly reliable, relatively easy to manufacture and at competitive costs.

This aim, these objects and others which will become apparent hereinafter are achieved by an aspirator for oil mists, particularly for machine tools and the like, characterized in that it comprises a substantially cylindrical external enclosure, inside which at least one impeller driven by an electric motor is accommodated, and a filtering module, which allows to filter the air aspirated by said impeller through said filtering module, characterized in that said enclosure is supported so that it can oscillate by a supporting frame in order to pass from a working position in which its axis is vertical with respect to a resting plane of said supporting frame to a working position in which its axis is horizontal with respect to said supporting plane.

BRIEF DESCRIPTION OF THE DRAWINGS

Further characteristics and advantages of the invention will become apparent from the description of a preferred embodiment of the aspirator according to the invention, illustrated only by way of non-limitative example in the accompanying drawings, wherein:

FIG. 1 is a perspective view of the aspirator according to the present invention;

FIG. 2 is a sectional view of the aspirator according to the present invention;

DESCRIPTION OF THE PREFERRED EMBODIMENTS

Figure 3:
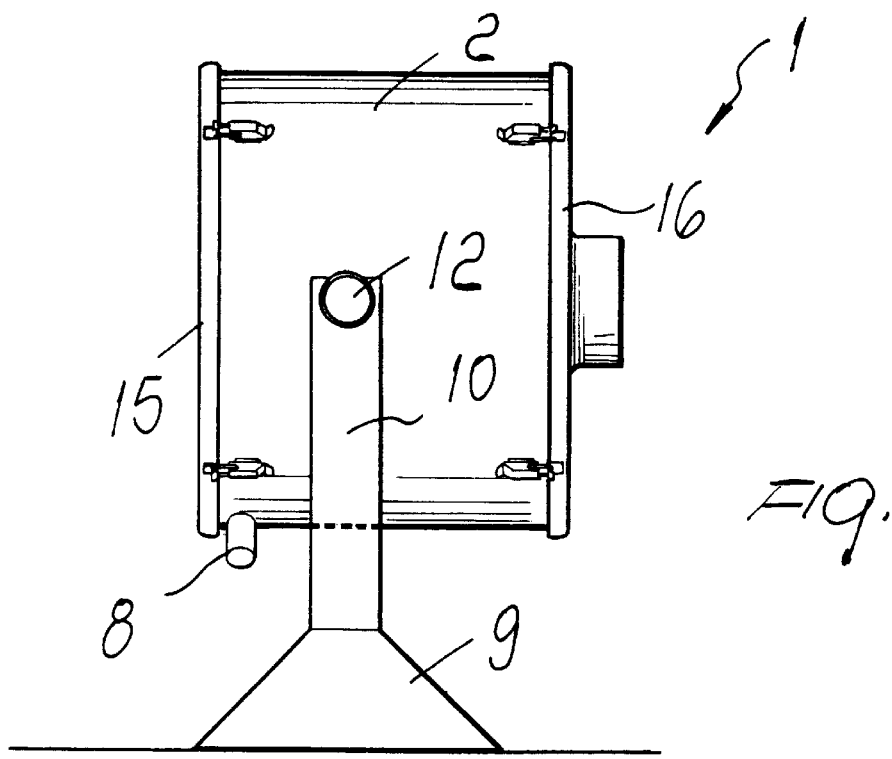
FIG. 3 is a view of the aspirator in the horizontal working position, according to the present invention.
Figure 4:
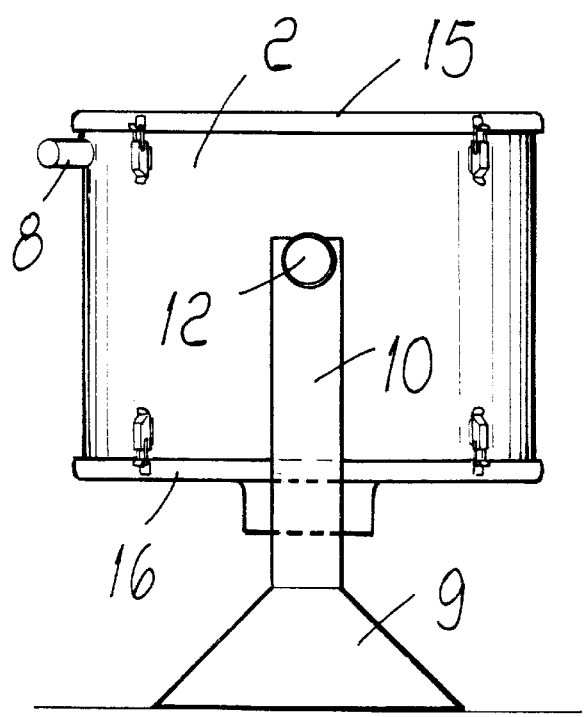
FIG. 4 is a view of the aspirator in the vertical working position, according to the present invention.

With reference to the above Figures, the aspirator according to the invention, generally designated by the reference numeral 1, comprises a substantially cylindrical external enclosure 2 inside which a filtering module 3 is associated; said module is formed by an annular element inside which an element 4 of the metal mesh type is inserted, allowing to support the filtering module 3.

The enclosure 2 contains an electric motor 5 which is arranged along the axis of the enclosure and is connected to an impeller 6 inside which the filter 3' is fitted; the impeller is arranged at the bottom of the enclosure 2 and allows to aspirate air that contains an oil mist from the machine tool into the enclosure 2 and through the filtering modules 3 and 3' in order to purify the air of the oil particles that it contains.

The enclosure 2 also has a drainage tube 8 for conveying the filtered oil externally; said tube is arranged so that its axis is inclined with respect to the tangent to the external surface of the enclosure 2.

The inclination of the drainage tube 8 improves the drainage of the oil filtered from the air that passes through the aspirator.

The enclosure 2 is supported by a supporting frame 9 which has two arms 10 and 11 to which the enclosure 2 is detachably connected by way of adapted locking means which are constituted for example by pivots 12 and 13 with corresponding nuts.

The enclosure 2 is locked to the arms 10 and 11 substantially at a median region of the enclosure 2, so that the enclosure can be arranged both so that its axis is parallel to the arms 10 and 11, and therefore the aspirator operates vertically, and so that its axis is perpendicular to the arms 10 and 11 of the supporting frame 9, i.e., so as to provide horizontal operation.

The connection between the arms 10 and 11 and the enclosure 2 occurs at ends of the arms 10 and 11.

In this manner, the aspirator can be operated both when arranged vertically and when arranged horizontally, simply by rotating it about the supporting frame 9, thus allowing easier maintenance (because it is not necessary to disassemble the aspirator from its support) and optimum adaptability to the different kinds of machine tool.

The impeller 6 used on the bottom of the enclosure 2 can be a turbine or a single centrifugal impeller or a double centrifugal impeller, depending on the type of suction required.

The enclosure 2 also comprises an upper covering element and a lower covering element, designated by the reference numerals 15 and 16 respectively.

The upper covering element 15 and the lower covering element 16 are also locked in position by way of adapted engagement means 14 which are arranged on the outer surface of the enclosure 2.

The upper covering element 15 has an integrated drainage ring 17 inside which the filtering module 4 is arranged. The drainage ring 17 facilitates maintenance because it can be accessed easily.

The impeller 6, meant to be accommodated in the enclosure 2, is provided with a border element 20 which is parallel to the axis of the impeller 6 and is meant to improve oil drainage and to simplify the welding of an annular shroud of perforated metal plate, designated by the reference numeral 21, which allows air to pass and is arranged around the impeller.

In practice it has been observed that the aspirator according to the invention fully achieves the intended aim and objects, since it can be used both horizontally and vertically, according to the requirements, and for simplified maintenance if necessary.

The aspirator according to the invention also allows better drainage thanks to the inclination of the drainage tube and of the border of the bottom of the centrifuge.

The possibility to use impellers of different kinds makes the aspirator according to the invention highly versatile, and the presence of a drainage ring integrated in the upper covering element allows to simplify the maintenance of the drainage ring and of the drainage tube.

The aspirator according to the invention is susceptible of numerous modifications and variations, all of which are within the scope of the inventive concept; all the details may furthermore be replaced with other technically equivalent elements.

In practice, the materials used, so long as they are compatible with the specific use, as well as the dimensions, may be any according to the requirements and the state of the art.

The disclosures in Italian Patent Application No. MI98A001622 from which this application claims priority are incorporated herein by reference.

What is claimed is:

1. An aspirator for oil mists for machine tools and other machining devices, comprising: a substantially cylindrical external enclosure having a longitudinal axis; at least one impeller; an electric motor for driving said at least one impeller, said electric motor and at least one impeller being accommodated in said enclosure; a filtering module for filtering air aspirated by said impeller and passed through the filtering module; a supporting frame for supporting said enclosure so as to oscillate from a working position in which the longitudinal axis thereof is vertical with respect to a resting plane of said supporting frame, to a working position in which said axis is horizontal with respect to said supporting plane, and further comprising a drainage tube for conveying outside said enclosure oil recovered by filtration of oil-saturated air passing through said filtering module, said drainage tube extending from a location point of an external surface of said enclosure, along an axis thereof, said tube axis being angled with respect to a plane being tangent to the external surface of said enclosure, in said location point.

2. The aspirator of claim 1, comprising; an upper covering element; a lower covering element, said upper and lower covering elements closing said enclosure; and a drainage ring which is integrated in said upper covering element.

3. The aspirator of claim 2, wherein said at least one impeller is a turbine.

4. The aspirator of claim 2, wherein said at least one impeller is a single centrifugal impeller.

5. The aspirator of claim 2, wherein said at least one impeller is a double centrifugal impeller.

6. The aspirator of claim 2, wherein said at least one impeller extends along a longitudinal axis, and comprises a bottom, and a border, provided at said bottom, so as to be parallel to the axis of said impeller.

7. The aspirator of claim 6, wherein said at least one impeller further comprises a perforated metal plate shroud, welded at said border.

8. The aspirator of claim 1, wherein said supporting frame is supported on a resting plane and comprises two arms which are perpendicular to the resting plane, said enclosure being pivoted at free ends of said arms so as to oscillate between said working positions.

9. An aspirator for oil mists, particularly for machine tools and other machining devices, comprising: a substantially cylindrical external enclosure having a longitudinal axis; at least one impeller; an electric motor for driving said at least one impeller, said electric motor and at least one impeller being accommodated in said enclosure; a filtering module for filtering air aspirated by said impeller and passed through the filtering module; a supporting frame for supporting said enclosure so as to oscillate from a working position in which the longitudinal axis thereof is vertical with respect to a resting plane of said supporting frame, to a working position in which said axis is horizontal with respect to said supporting plane, and further comprising an upper covering element and a lower covering element, said upper and lower covering elements closing said enclosure; a drainage ring being integrated in said upper covering element.

10. The aspirator of claim 9, comprising a drainage tube for conveying outside said enclosure oil recovered by filtration of oil-saturated air passing through said filtering module, said drainage tube extending from a location point of an external surface of said enclosure, along an axis thereof, said tube axis being angled with respect to a plane being tangent to the external surface of said enclosure, in said location point.

11. The aspirator of claim 9, wherein said at least one impeller is a turbine.

12. The aspirator of claim 9, wherein said at least one impeller is a single centrifugal impeller.

13. The aspirator of claim 9, wherein said at least one impeller is a double centrifugal impeller.

14. The aspirator of claim 9, wherein said at least one impeller extends along a longitudinal axis, and comprises a bottom, and a border, provided at said bottom, so as to be parallel to the axis of said impeller.

15. The aspirator of claim 14, wherein said at least one impeller further comprises a perforated metal plate shroud, welded at said border.

16. The aspirator of claim 9, wherein said supporting frame is supported on a resting plane and comprises two arms which are perpendicular to the resting plane, said enclosure being pivoted at free ends of said arms so as to oscillate between said working positions.

* * * * *